UNITED STATES PATENT OFFICE.

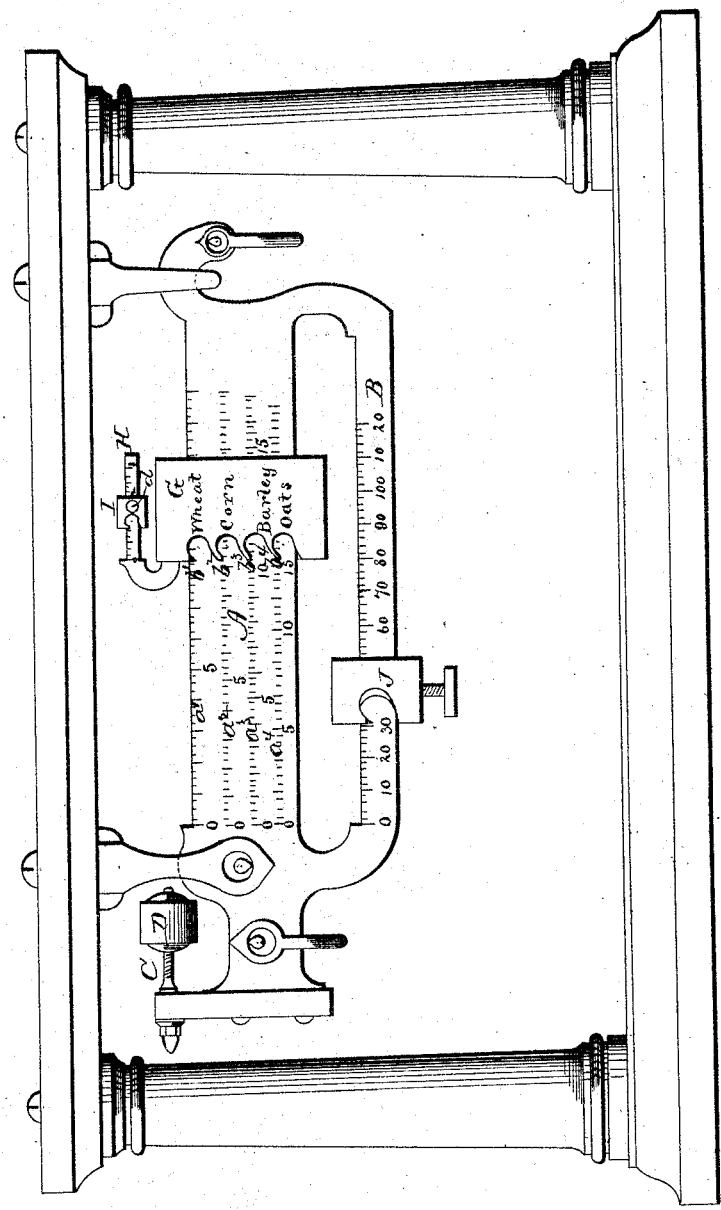

LUKE G. SPENCER, OF ST. JOHNSBURY, VERMONT, ASSIGNOR TO E. AND T. FAIRBANKS & CO., OF SAME PLACE.

IMPROVEMENT IN BEAM-SCALES.

Specification forming part of Letters Patent No. 157,882, dated December 15, 1874; application filed October 24, 1874.

*To all whom it may concern:*

Be it known that I, LUKE G. SPENCER, of St. Johnsbury, in the county of Caledonia and State of Vermont, have invented certain new and useful Improvements in Weighing-Scales; and I do hereby declare that the following is a full, clear, and exact description thereof, which will enable others skilled in the art to which it pertains to make and use the same, reference being had to the accompanying drawings and to the letters of reference marked thereon, which form a part of this specification.

With the scales now generally used for weighing grain or other material by the bushel, where two or more kinds are to be weighed on the same scale, it has heretofore been necessary to furnish two or more sets of weights with each scale. This has been found very objectionable, on account of the liability to make mistakes by using the wrong weight—for instance, using a weight scaled to draw ten bushels of wheat at sixty pounds to the bushel when weighing corn which is fifty-six, and other similar mistakes. There is also danger of losing weights, and thereby render the scale useless for a time. To obviate these difficulties, save expense of manufacture, and simplify this class of scales, are the objects of my invention; and to this end the nature of my invention consists in the construction and arrangement of the scale-beam with the poises thereon, as will be hereinafter more fully set forth, whereby the whole capacity of the scale is placed on the beam, dispensing with loose weights, and thereby preventing all liability of misplacing or losing them, and without changing or making any alteration in the beam.

The figure in the accompanying drawing represents a side elevation of my improved scale-beam with its poises.

My scale-beam is slotted longitudinally, so as to form, as it were, two separate parallel beams, A and B, connected at their ends, and located one above the other. This beam, or double beam, A B, is supported and connected to the usual levers, which support the scale-platform in any of the known and usual ways, which require no description here, as I lay no claim thereto. The beam A B is, at its inner end, provided with the ordinary horizontal screw-shaft C and poise or weight D, movable thereon for adjusting and balancing the scale properly. The main bar A of the beam is provided on its face with a series of horizontal lines of separate and independent graduations, marked, respectively, $a^1\ a^2\ a^3\ a^4$. In arranging these graduations the following principle is observed: If a poise be heavy enough to balance, at a certain point on the beam, sixty bushels of wheat at sixty pounds per bushel, the same poise at the same point will balance seventy-five bushels of barley at forty-eight pounds per bushel, their weight being equal; hence the distance of that point from the zero of the scale, divided in the first case in sixty equal parts, and in the second case in seventy-five equal parts, would indicate bushels of wheat or barley with equal accuracy. Upon this principle the beam may be graduated for any article sold by the bushel, and any two or more of such graduations may be made on the same beam. On the bar A of the beam is the main poise G, provided with a series of indexes or fingers, $b^1\ b^2\ b^3\ b^4$, corresponding with the different lines of gradations on the bar, and opposite each index, on the face of the poise, I propose to mark in plain letters the article for which such index and its corresponding lines of graduations are intended. On top of the main poise G is formed or attached a horizontal scale-beam, H, graduated for pounds and provided with a poise, I. This is designed for indicating the excess in pounds over even bushels, if desired. For instance, if the large poise G stands at twenty bushels of wheat and the scale does not quite balance, but the operator or attendant wishes to know just how much there is on the scale, he moves the small poise I on its beam H till the scale does balance; it will show him just how many pounds there are over the even twenty bushels indicated by the main beam. If he only cares to know the even bushels, or half and quarter bushels, the main beam being marked for them, he can move the small poise I to zero on the beam H, and fasten it there by a set-screw, $d$, and then use the main poise G as though the other were not there. The bar B of the beam is graduated for pounds, and provided with a separate poise, J, to be used for tare, or to determine the pounds of the main load after moving the poise G to zero, or for any purpose that an ordinary pound-scale can be used for.

I propose in some cases to graduate one of the lines of graduations of the main bar to indicate pounds. In such case that fact should be plainly marked on the poise. I also propose in some cases to add a line of graduations reading to gross weight on the same beam, and with the same poise as net pounds.

Having thus fully described my invention, what I claim as new, and desire to secure by Letters Patent, is—

1. The combination of a scale-beam having two or more separate and independent graduations upon a plane surface, said graduations being arranged for grains of different weights per bushel, and a poise having index-fingers corresponding in number to the number of graduations, and marked with the name of the grain to be weighed, as and for the purpose set forth.

2. A scale-beam having two or more graduations and supporting a poise, G, with index-fingers corresponding to the number of graduations on the beam, in combination with the scale-beam H and poise I, attached to and moving with the poise G, all constructed as and for the purpose set forth.

3. The device herein described, consisting essentially of the beams A and B, constructed in one piece, in combination with the poise J and poise G, having the index-fingers, as described, and carrying the scale H and poise I, and the weight D and screw C, all constructed as and for the purpose specified.

In testimony that I claim the foregoing as my own I affix my signature in presence of two witnesses.

LUKE GILBERT SPENCER.

Witnesses:
 WM. S. HILL,
 AZNO BLANCHARD.